(12) United States Patent
Shibata et al.

(10) Patent No.: US 6,410,895 B2
(45) Date of Patent: Jun. 25, 2002

(54) INDUCTION HEATING COIL UNIT FOR MANIFOLD IN HOT RUNNER MOLD

(75) Inventors: Itsuo Shibata; Shinichi Edagawa, both of Hiratsuka; Ryoichi Sekiguchi, Kanagawa; Hitoshi Toki, Isehara; Tamotsu Munakata, Fujisawa, all of (JP)

(73) Assignee: Ju-Oh Inc., Hiratsuka (JP)

( * ) Notice: Subject to any disclaimer, the term of this patent is extended or adjusted under 35 U.S.C. 154(b) by 0 days.

(21) Appl. No.: 09/887,099

(22) Filed: Jun. 25, 2001

Related U.S. Application Data

(62) Division of application No. 09/729,205, filed on Dec. 5, 2000, now Pat. No. 6,310,333, which is a continuation of application No. PCT/JP00/02964, filed on May 10, 2000.

(30) Foreign Application Priority Data

May 12, 1999 (JP) .............................. 11-131953

(51) Int. Cl.[7] .............................. H05B 6/10; H05B 6/40
(52) U.S. Cl. ...................... 219/635; 219/672; 219/676; 425/174.8 R
(58) Field of Search ................................. 219/676, 972, 219/673, 635; 425/174.8 R, 174.8 E

(56) References Cited

U.S. PATENT DOCUMENTS

| | | | |
|---|---|---|---|
| 2,052,010 A | * 8/1936 | Bailey | 219/673 |
| 3,525,842 A | * 8/1970 | Steinhoff et al. | 219/639 |
| 3,632,943 A | * 1/1972 | Engler et al. | 219/633 |
| 4,585,916 A | * 4/1986 | Rich | 219/676 |
| 5,786,575 A | * 7/1998 | Bleske et al. | 219/676 |

* cited by examiner

Primary Examiner—Philip H. Leung
(74) Attorney, Agent, or Firm—Kanesaka & Takeuchi

(57) ABSTRACT

In an induction heating coil unit for a manifold in a hot runner mold, it is possible to uniformly heat a material over the entire length of a runner. Also, a coil is easily attached to and detached from the manifold. The hot runner mold includes a fixed mold and a movable mold, and a space is provided along a side surface of the manifold on which clamping force applied by the fixed mold and the movable mold does not act. A coil is wound to the side surface along an axial line of a runner of the manifold within the space such that the manifold is induction-heated from the side surface.

6 Claims, 10 Drawing Sheets

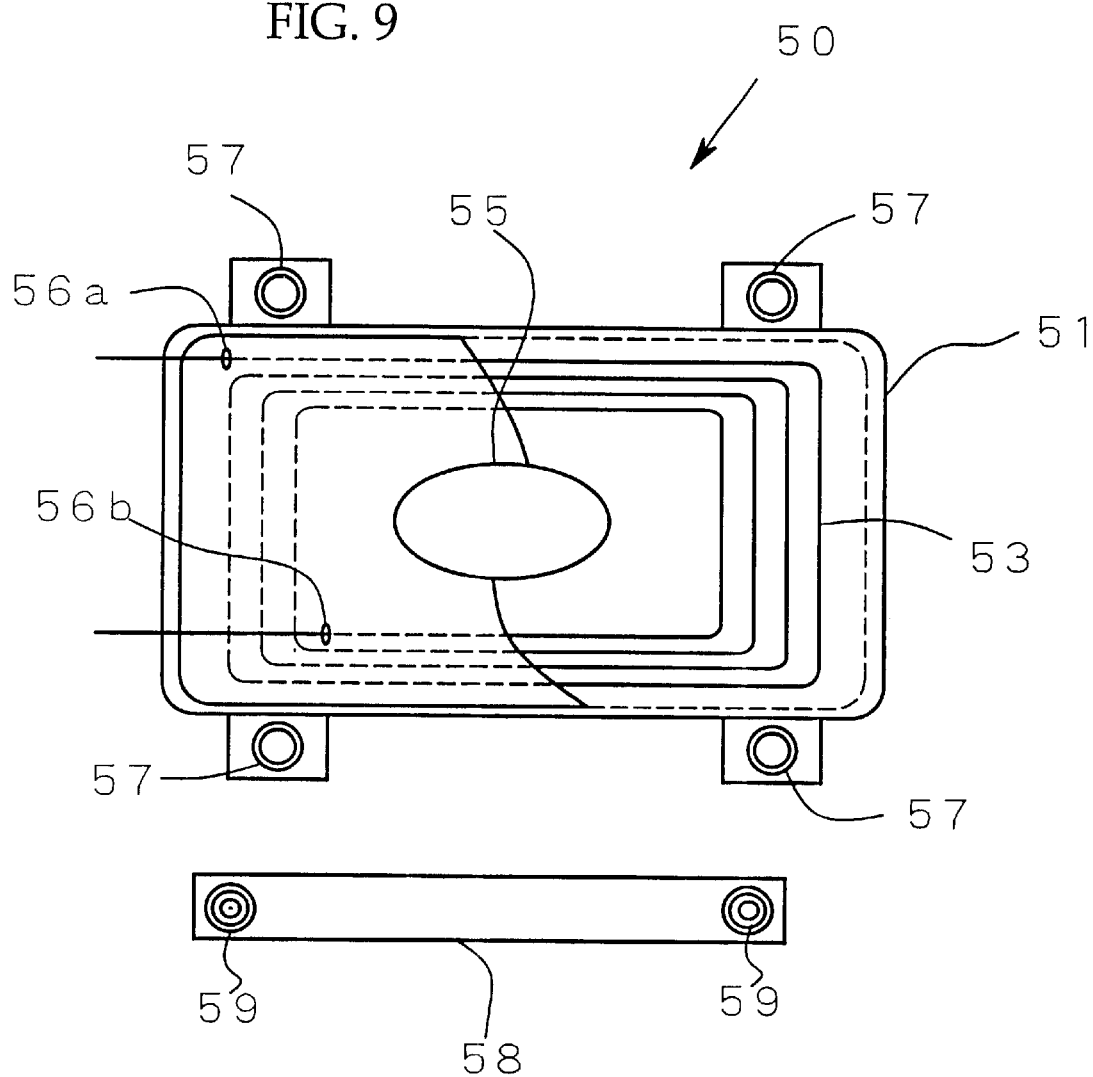

INDUCTION HEATING COIL UNIT FOR MANIFOLD IN HOT RUNNER MOLD

Cross Reference to Related Application

This is a divisional application of Ser. No. 09/729,205 filed on Dec. 5, 2000, which is a continuation application of PCT International Application of PCT/JP00/02964 filed on May 10, 2000.

TECHNICAL FIELD

The present invention relates to an induction heating coil unit for a manifold in a hot runner mold.

BACKGROUND ART

In a hot runner mold, it is necessary to maintain material within the runner in a molten condition by heating the runner. Heater heating and induction heating have been known as methods for heating the runner. The induction heating can heat the material to a desired temperature in a shorter time than the heater heating. Further, the induction heating has the advantage that it is superior in controllability of temperature and power consumption is also small.

FIG. 10 is for showing a prior art of the present invention and is a schematic side view of a manifold heated by induction heating.

A manifold 10 has a sprue portion 11 for introducing molten material sent from an injection cylinder (not shown) into the manifold 10 and a runner portion 12 for distributing the molten material as flown from the sprue portion 11 to nozzles 20. The manifold 10 is disposed within a space formed between a fixed mold plate 1 of the hot runner mold and a back plate 2 mounted to a rear surface thereof. At a time of injection molding, a large mold clamping force acts on the fixed mold plate 1, the nozzles 20 and the back plate 2. For this reason, the manifold 10 is supported by heat-insulating supporting members 16 at a plurality of portions between the fixed mold plate 1 and the back plate 2 so as to prevent the manifold 10 from being distorted or displaced due to the clamping force.

Coils 15 for induction heating are wound around an outer periphery of the manifold 10 at portions at which the manifold is not supported by the supporting members 16. When voltage is applied to the induction heating coils 15, the material within the runner is heated at portions where the induction heating coils 15 are wound.

In the above-described induction heating method there are the following drawbacks.

(1) In order to heat material uniformly, it is preferable to wind the coils 15 over the entire length of the runner portion 12. However, portions where the coils 15 may be wound will be limited by the supporting members 16 for supporting the manifold 10. Therefore, there is a drawback that variations occur in temperature of the molten material within the runner to result in irregularities in qualities of injection-molded articles and in pouring deficiencies.

(2) In case of injection molding of molten metal having a high melting point and exhibiting favorable thermal conductivity, such as magnesium, it will be required to heat the material located at portions where induction heating is performed to a temperature that is remarkably higher than the melting point thereof. This consequently increases the possibility of run-out or thermal distortion and also shortens the life of the coils themselves.

(3) As one method for solving the above drawback, it is considered to form through holes on the supporting members and to wind the induction heating coils around the periphery of the manifold 10 through these through holes. However, forming the through holes into the supporting members formed of material such as ceramics will result in higher cost. The through holes will further weaken the strength of the supporting members.

(4) The respective coils 15 are connected by lead wires each other. These lead wires are connected to an external power supply source through the back plate 2. A drawback is accordingly presented that the coils 15 are hard to be detached from the manifold 10 at a time of performing exchange, inspection or repair of the manifold 10 and thus worsens the workability.

The present invention has been made in view of these drawbacks, and it is an object thereof to provide an induction heating method for a manifold of a hot runner mold and a coil unit for induction heating with which it is possible to uniformly heat material over the entire length of a runner without weakening the strength of a supporting member and in which the coil may be easily attached to and detached from the manifold.

DESCRIPTION OF THE INVENTION

Clamping force acts onto the manifold 10 in a direction identical to a clamping direction thereof (which is a direction indicated by arrow X in FIG. 10). The inventors of the present invention have completed the present invention in view of the fact that no clamping force acts onto a side surface 10b of the manifold 10 that is parallel to the clamping direction. In other words, the manifold 10 only needs to be supported by the supporting members 16 at a surface 10a that is orthogonal to the clamping direction, and a space in a length direction may be secured over the entire length of the runner portion 12 on the side surface 10b.

More particularly, the present invention relates to an induction heating method for a manifold of a hot runner mold including a fixed mold and a movable mold, the induction heating method comprising the steps of: providing a space along a side surface on which no clamping force is applied by the fixed mold and the movable mold of the manifold; winding a coil to the side surface along an axial line of a runner of the manifold; and performing induction heating of the manifold from the side surface.

According to this method, the material within the manifold may be uniformly heated over the entire length thereof. Attaching and detaching the coil to and from the manifold will also become easy.

Also, a method may be employed where the coil is wound to extend in a spiral manner from the side surface to a surface orthogonal to the clamping direction, and the manifold is induction-heated from the side surface and the surface orthogonal to the claming direction by this spiral coil.

According to this method, induction heating of the manifold may be performed not only from the side surface but also from the surface orthogonal to the clamping direction so that the temperature of the material may be made more uniform. Attaching and detaching the coil to and from the manifold will also become easy.

Furthermore, a method may be employed where the manifold is partitioned into a plurality of portions to divide each portion into a single region and the spiral coil is wound for each region to perform induction heating.

With using spiral coils, it will be possible to easily wind a coil around an arbitrary portion and to perform induction heating of the manifold from the side surface. It will further be possible to adjust temperature of the material of each portion to a desired temperature.

An induction heating coil unit according to the present invention is a unit for a manifold of a hot runner mold including a fixed mold and a movable mold, comprising a coil holding body that is provided to be attachable and detachable to and from the manifold and disposed within a space formed along a side surface on which no clamping force is applied by the fixed mold and the movable mold of the manifold, and a coil that is held by the coil holding body and is wound to the side surface along an axial line of a runner of the manifold, wherein the manifold is heated from the side surface.

With this arrangement, the material may be uniformly heated over the entire length of the runner. The coil may further be easily attached to and detached from the manifold.

Alternatively, the coil holding body may be provided on both of opposing side surfaces of the manifold astride the surface orthogonal to the clamping direction wherein a coil is held by the coil holding body in a spiral manner.

With this arrangement, induction heating of the manifold may be performed not only from the side surface but also from the surface orthogonal to the clamping direction so that the temperature of the material may be made more uniform. Attaching and detaching the coils to and from the manifold will also become easy.

BRIEF DESCRIPTION OF THE DRAWING

FIG. 9 illustrates still another embodiment of a coil unit for induction heating of the present invention and is a plan view of the coil unit for induction heating.

BEST MODE FOR CARRYING OUT THE INVENTION

Figure 10:
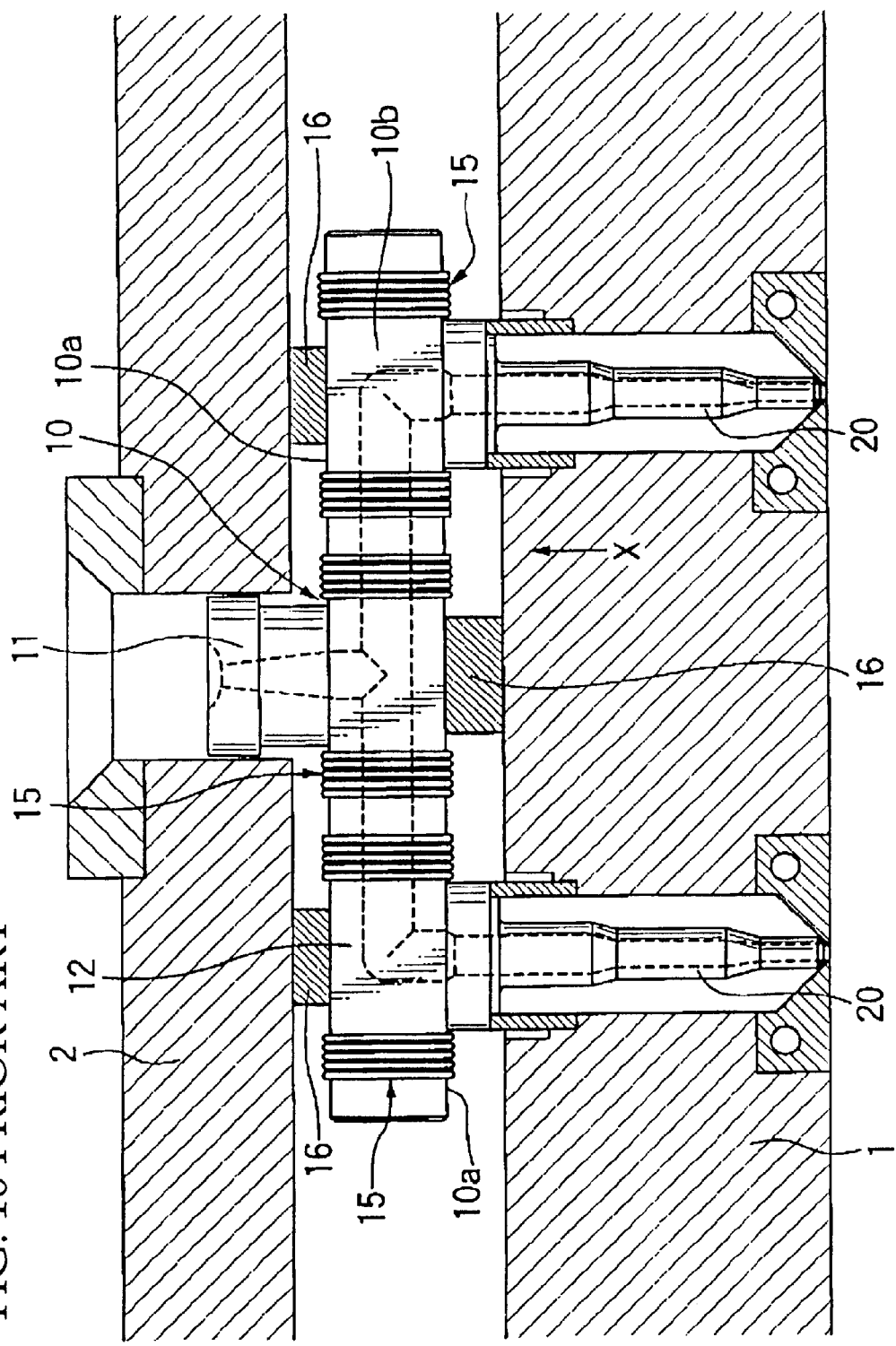
FIG. 10 is a side view of a manifold according to the prior art of the present invention.

Preferable embodiments of an induction heating method for a manifold in a hot runner mold according to the present invention will be explained below with reference to the drawings. It should be noted that portions and members that are identical to those of the manifold as illustrated in FIG. 10 are marked with identical reference numerals, and detailed explanations thereof will be omitted.

Figure 1:
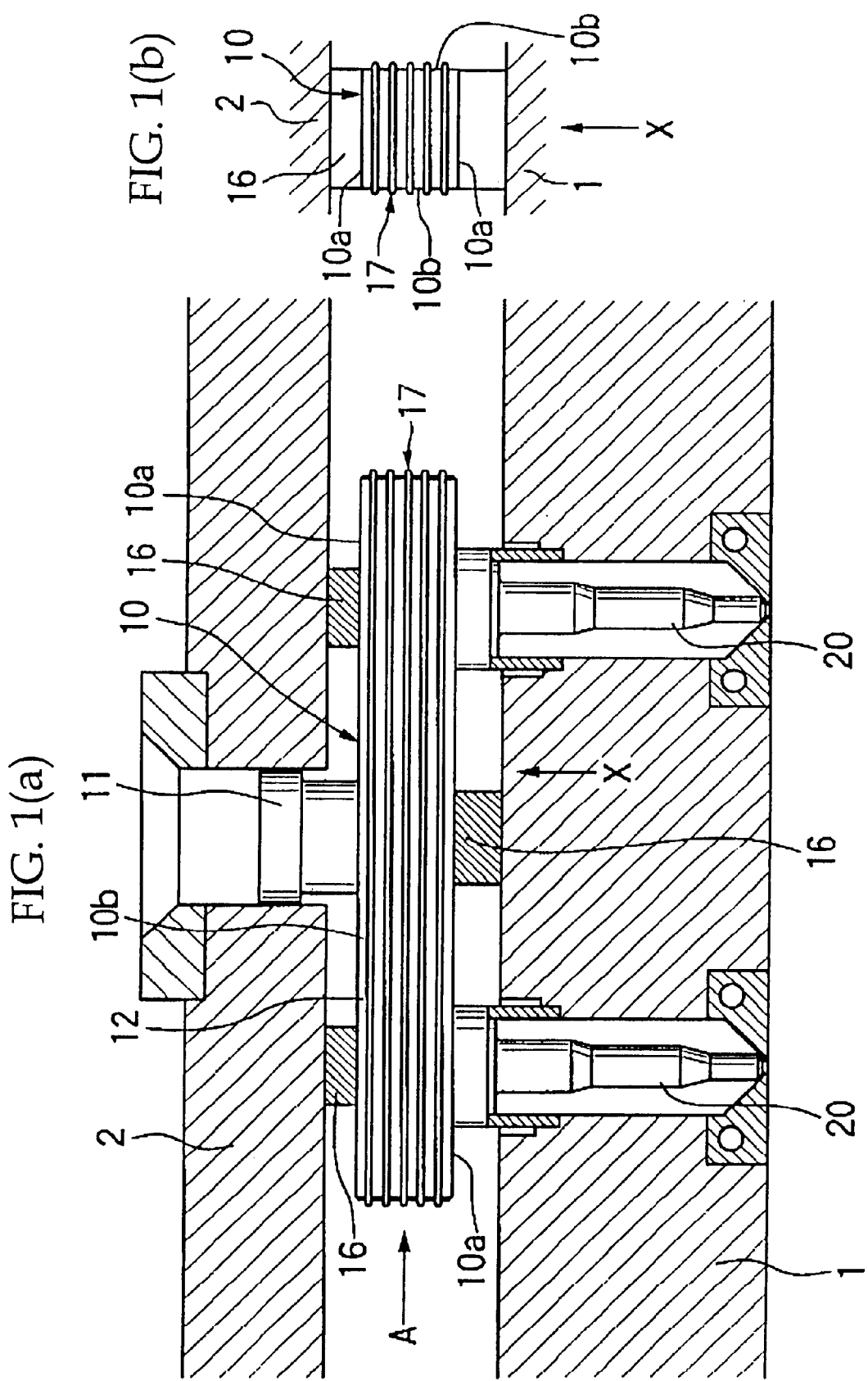
FIG. 1(a) is a schematic plan view of a manifold for explaining the concept of induction heating method according to the present invention.
FIG. 1(b) is a view seen from a direction as indicated by arrow A in FIG. 1(a).

FIG. 1 is a schematic view of a manifold for explaining the concept of an induction heating method according to the present invention, wherein FIG. 1(a) is a plan view thereof, and FIG. 1(b) is a view seen from a direction as indicated by arrow A in FIG. 1(a).

Clamping force that is applied when a movable mold plate (not shown) is pressed against a fixed mold plate 1 acts in a direction as indicated by arrow X in FIG. 1. A surface 10a of a manifold 10 that is orthogonal to the direction indicated by arrow X is supported by heat-resistant supporting members 16 at predetermined portions. A space is secured between the fixed mold plate 1 and a back plate 2 on the side surface 10b side of the manifold 10 that is parallel to the direction indicated by arrow X. A (oil 17 is wound within this space along the side surface 10b). It is alternatively possible to preliminarily form a coil unit by winding the coil 17 along the side surface 10b of the manifold 10 and to mount this coil unit to a periphery of the manifold 10 when assembling the manifold 10.

As described above, there is no obstacle such as the supporting members 16 on the side surface lob of the manifold 10. Thus, the coil 17 may be easily wound around the manifold 10. By applying voltage to the coil 17, induction heating may be performed along the entire length of a runner portion 12 of the manifold 10 and thus to uniformly heat material within the runner.

Figure 2:
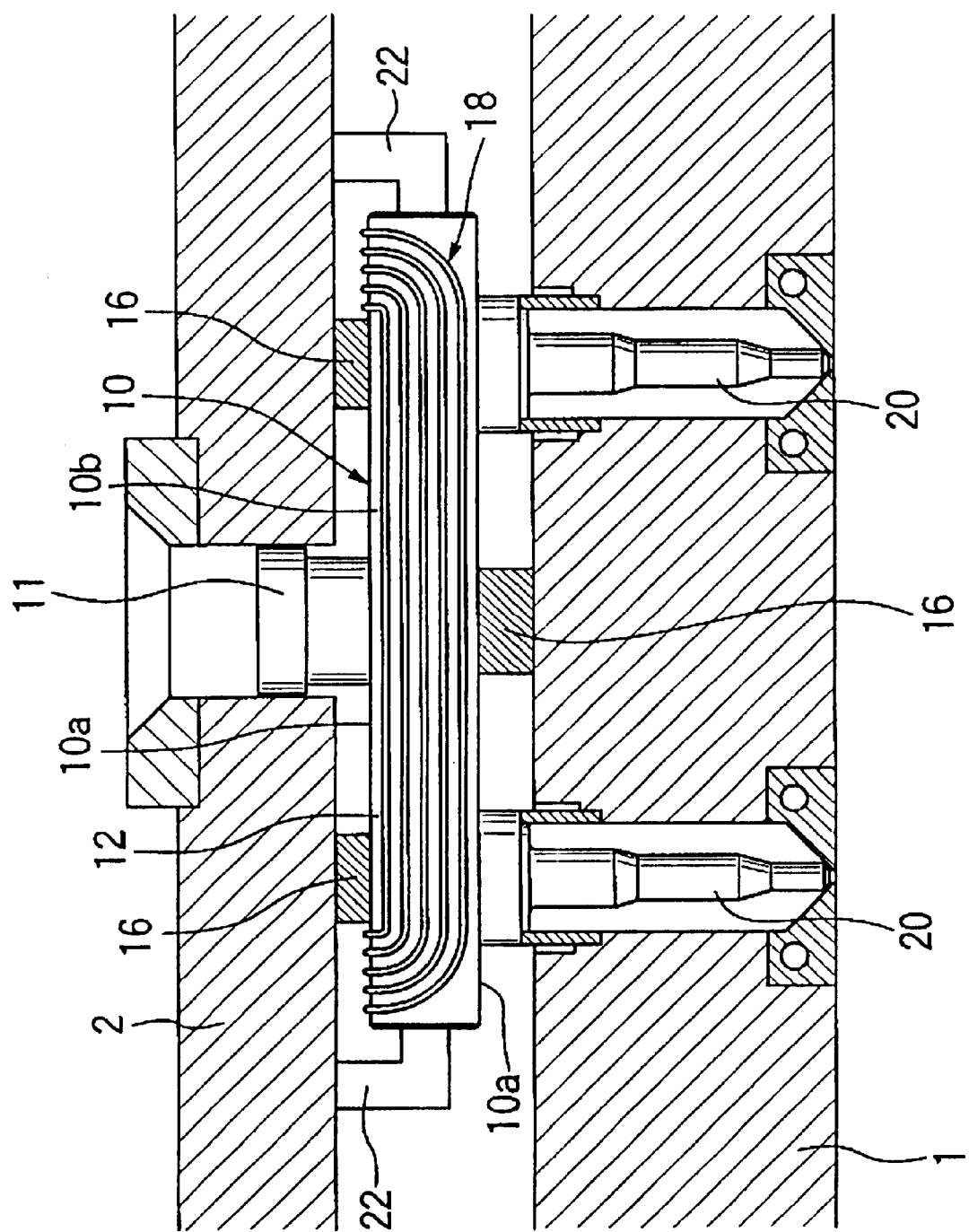
FIG. 2 illustrates another embodiment of the induction heating method of FIG. 1.
Figure 3:
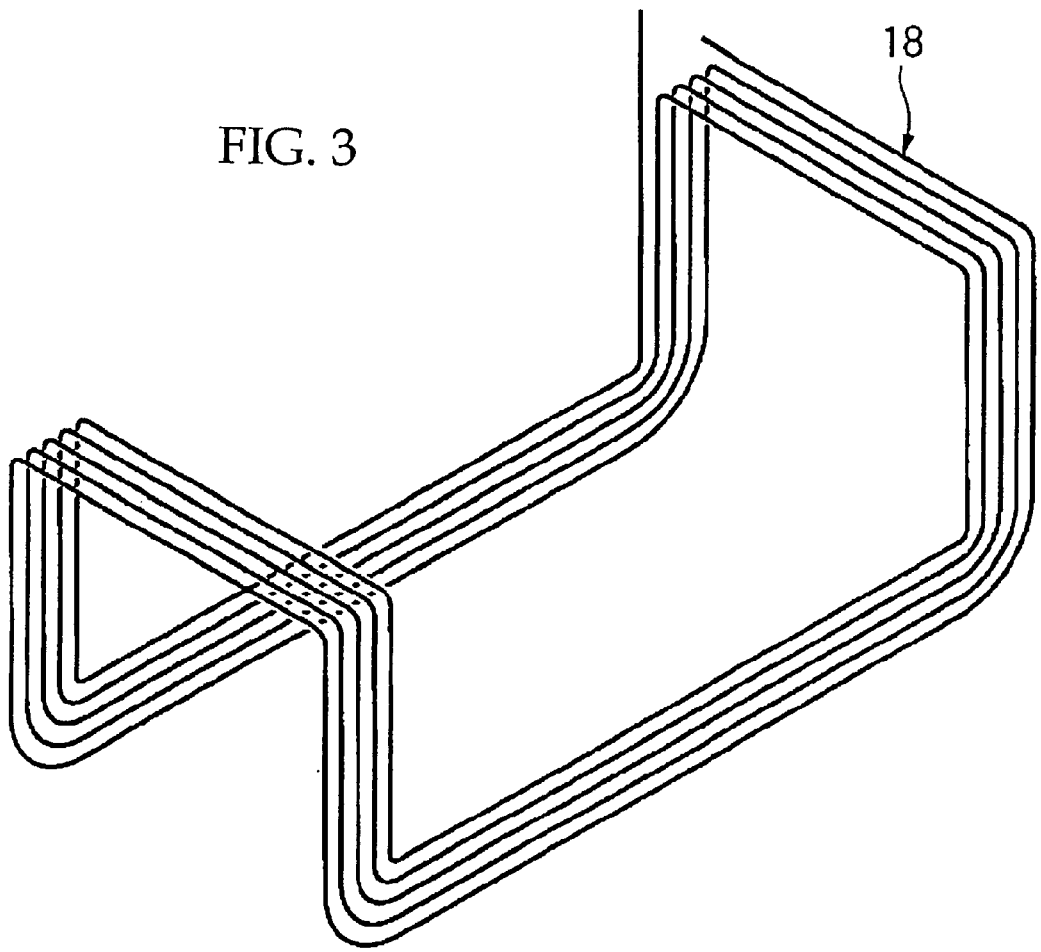
FIG. 3 is a perspective view showing a schematic representation of a coil body formed around the manifold according to the embodiment illustrated in FIG. 2.

FIG. 2 illustrates an embodiment of the induction heating method of FIG. 1. Both ends of the manifold 10 in longitudinal direction may be fixed to the back plate 2 through fixing members 22, 22. In this embodiment, a coil 18 is wound in a spiral manner to extend from the side surface 10b of the manifold 10 to the surface 10a while avoiding the fixing members 22, 22. The coil unit thus formed assumes a shape of a saddle opened at its central portion, as illustrated in FIG. 3. The coil body having such a shape as illustrated in FIG. 3 may be easily attached to the manifold 10 from the surface 10a on the back plate 2 side.

Even in this embodiment, when voltage is applied to the coil 18, the runner portion 12 of the manifold 10 may be similarly heated over the entire length and the material contained therein may be uniformly heated.

Figure 4:
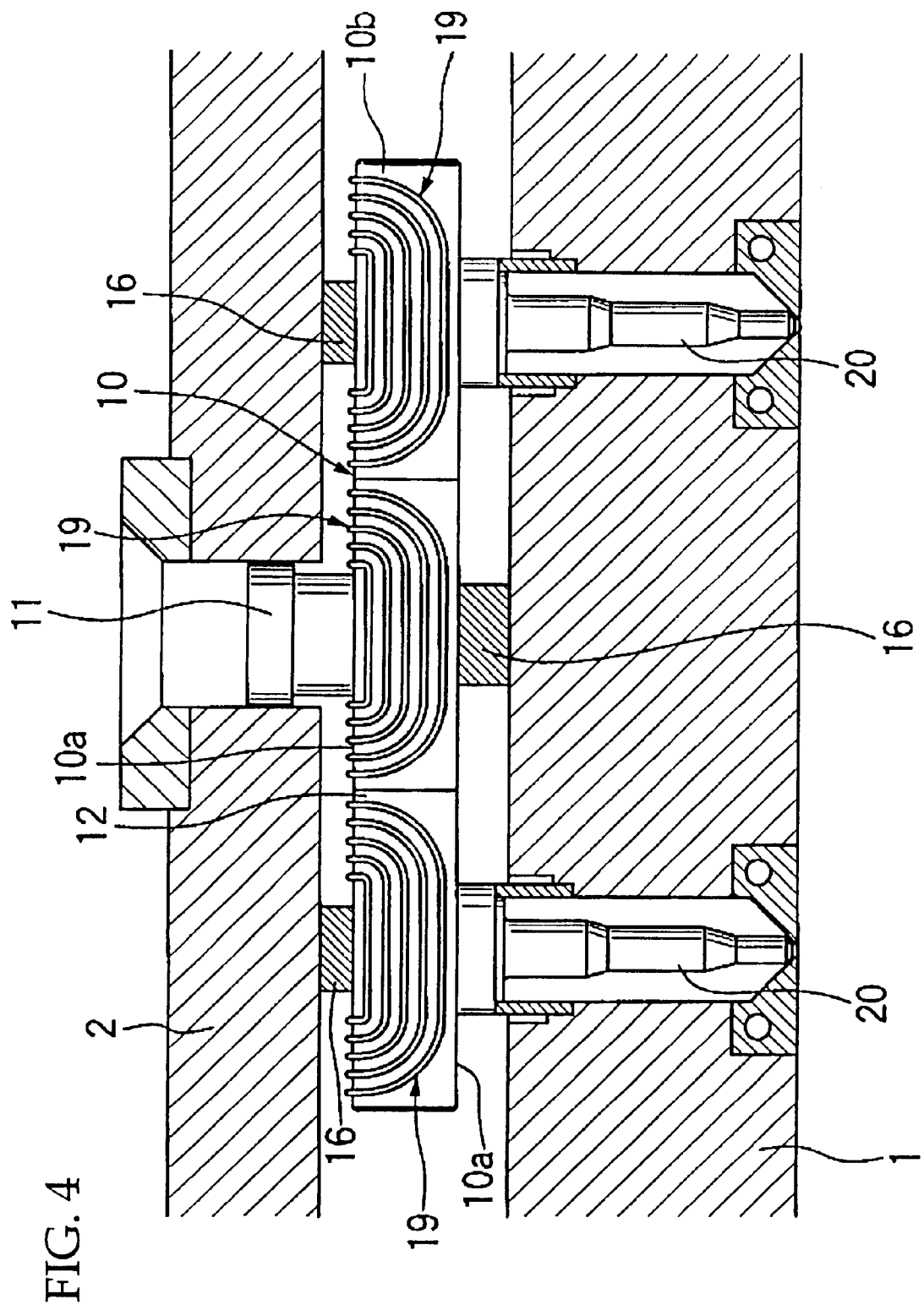
FIG. 4 illustrates still another embodiment of the induction heating method of FIG. 1.

FIG. 4 illustrates still another embodiment of the induction heating method of FIG. 1. In this embodiment, the manifold 10 is partitioned into a plurality of regions. Coils 19 are wound to extend from the side surface 10b to the surface 10a in respective regions. In the illustrated example, the manifold 10 is divided into three portions of both end portions supported by the supporting members 16 and a central portion having a sprue portion 11. The number of division is not limited to three but may also be two or not less than four. By attaching the coils 19 to the respectively divided regions in this manner, the manifold 10 may be heated for each desired region. It is further possible to uniformly heat the material over the entire length of the runner portion 12 by disposing a predetermined number of coil units comprised by wound coils 19 in accordance with the length of the manifold 10, irrespective of the dimension of the manifold 10 being either long or short. In this case, it is desirable to connect respective coils 19 to be mutually attachable and detachable by means of connectors.

One embodiment of a coil unit for induction heating according to the present invention will now be explained in details with reference to FIGS. 5 to 7.

Figure 5:
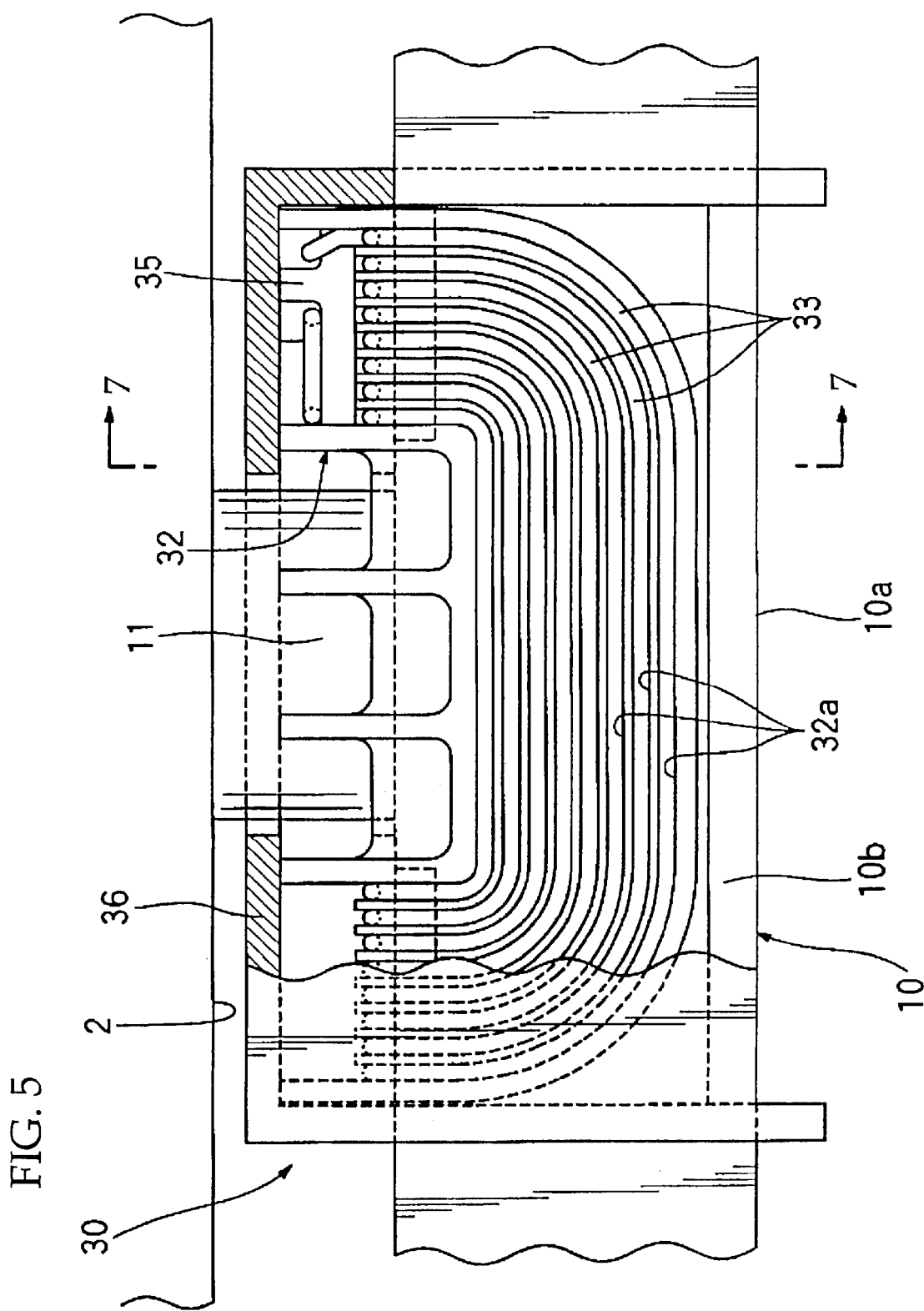
FIG. 5 is a front view of a coil unit for induction heating according to one embodiment of the present invention.
Figure 6:
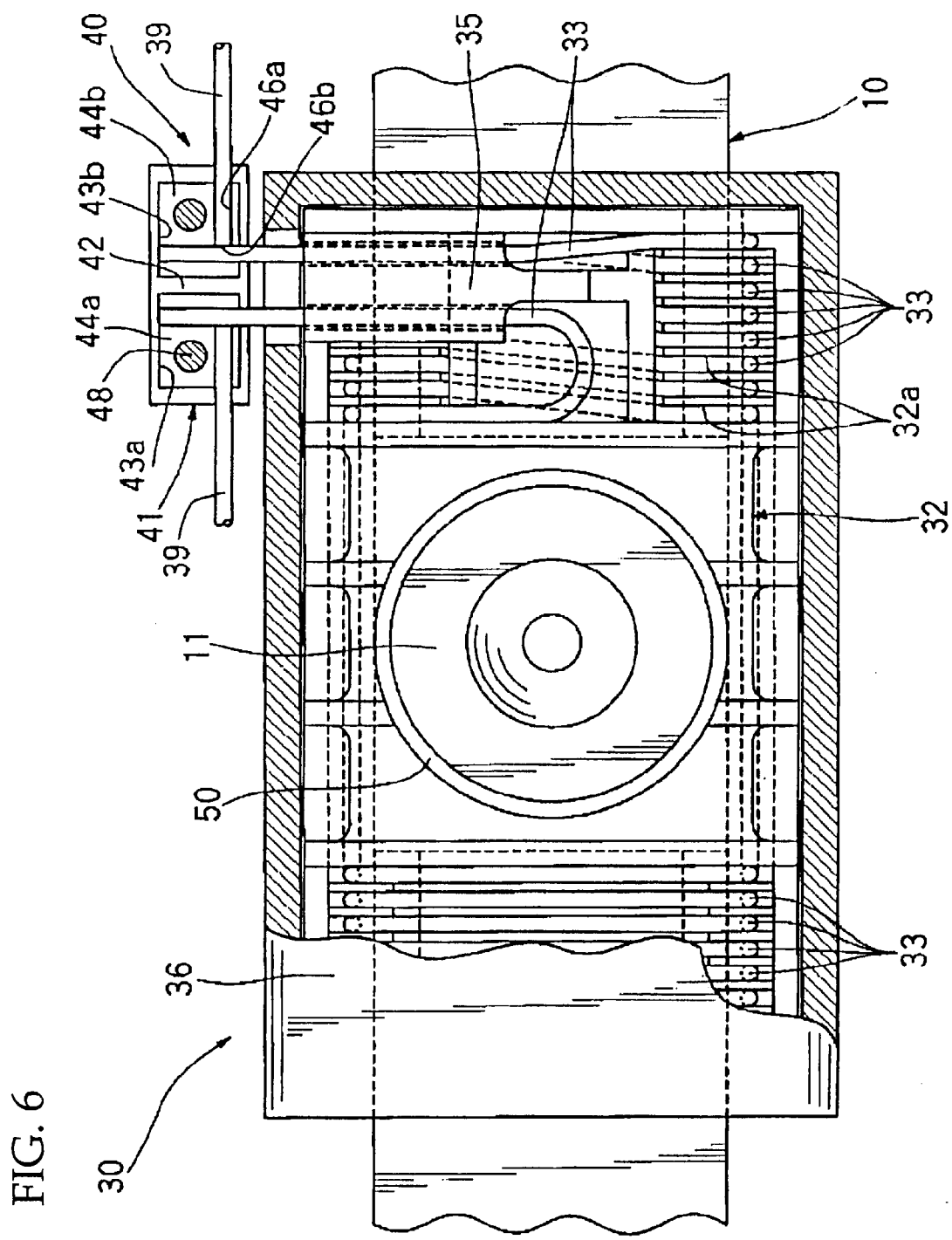
FIG. 6 is a plan view of the coil unit for induction heating of FIG. 5.
Figure 7:
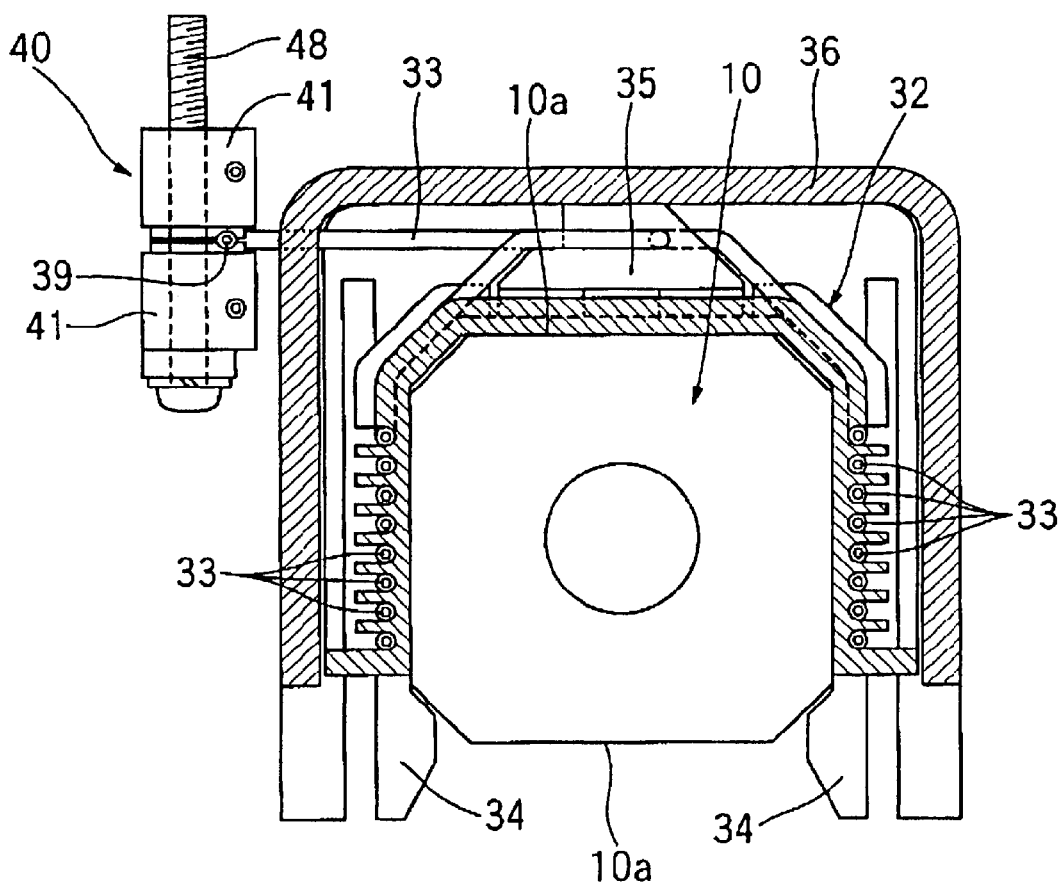
FIG. 7 is a view seen from a direction as indicated by arrows 7—7 of the coil unit for induction heating of FIG. 5.

FIG. 5 is a front view of a coil unit for induction heating according to one embodiment of the present invention, FIG. 6 is a plan view of the coil unit for induction heating of FIG. 5, and FIG. 7 is a view seen from a direction as indicated by arrows 7—7 of the coil unit for induction heating of FIG. 5.

A coil unit for induction heating 30 comprises a hollow and saddle-shaped coil holding body 32 that is freely attachable/detachable to and from the manifold 10, a coil 33 held by the coil holding body 32, and a cover 36 for covering an exterior of the coil holding body 32.

The coil holding body 32 is formed of non-conductive material with superior heat-resistant properties, for instance, ceramics. On a surface thereof, a helically continuous groove 32a is formed along an outer configuration of the coil holding body 32. The coil, 33 is fitted into this groove 32a while being helically wound and is held thereat. The coil 33 fitted into the groove 32a may be fixed to the coil holding body 32 through arbitrary and suitable adhesive or the like exhibiting superior heat-resistant properties. Both ends of the coil 33 are led outside the coil unit for induction heating 30 by a terminal handling member 35 provided on one side of the coil holding body 32.

The coil holding body 32 is further provided with engaging pawls 34 on both ends of its opening portion for engaging with corner portions of the manifold 10. The engaging pawls 34 are formed to assume tapered shapes when seen from the side surface for enabling easy attaching and detaching to and from the manifold 10 of the coil unit for induction heating 30.

One or a plurality of the coil units for induction heating 30 of the above-described arrangement may be mounted in a longitudinal direction of the manifold 10. In a case that the plurality of the coil units for induction heating 30 are attached in the longitudinal direction, it is preferable to connect the coils 33 of respective coil units for induction heating 30 by connectors 40. The connector 40 may has any conventional arrangement as far as both ends of the coils 33 and lead wires 39 may be easily connected.

The connector 40 in this embodiment comprises a case 41 whose interior is formed with two chambers 43a, 43b by an insulating partition 42, and conductive holding members 44a, 44b that are respectively inserted into the chambers 43a, 43b of the case 41. The holding members 44a, 44b are respectively formed with grooves 46a, 46b into which both ends of the coil 33 and the lead wire 39 are fitted. The case 41 is further formed in a structure that is vertically separable into two parts. One of the parts serves as a holding member for fixing both ends of the coil 33 and the lead wires 39 by pinching, and is further provided to enable disassembly and assembly through bolts 48 for mounting the connector 40 to the back plate 2 (see FIG. 10). Thus, by loosening the bolts 48, the case 41 of the separable arrangement is loosened for enabling attaching and detaching of both ends of the coil 33 and the lead wires 39. Since the holding members 44a, 44b are formed of metal exhibiting superior conductivity such as iron, steel or aluminum, both ends of the coil 33 and the lead wires 39 may be connected in an easy and reliable manner by simply fitting both ends of the coil 33 and the lead wires 39 to the grooves 46a, 46b, respectively, and fastening the bolts 48.

In the coil unit for induction heating 30 to be mounted around the sprue portion 11, it is preferable to form a fit-mounting portion 50 surrounding the sprue portion 11. With the fit-mounting portion 50, the coil unit for induction heating 30 can accurately be positioned above the manifold 10. By winding a coil (not shown) around the fit-mounting portion 50, material in the sprue portion 11 may also be heated. It should be noted that the sprue portion 11 of the manifold 10 be preferably of straight shape without any projections such as flanges in view of attaching and detaching of the coil unit for induction heating 30 provided with the fit-mounting portion 50, Further, it is preferable that the thickness of the sprue portion 11 is made as thin as possible for realizing effective heating through induction heating.

When the coil unit for induction heating 30 of the above-described arrangement is mounted to the manifold 10 and current is supplied to the coil 33 through the lead wires 39 and the connector 40, the manifold 10 is induction-heated from the side surface 10b side so that the material within the runner 12 (see FIG. 10) is uniformly heated.

Another embodiment of the coil unit for induction heating according to the present invention will now be explained with reference to FIG. 8.

Figure 8A:
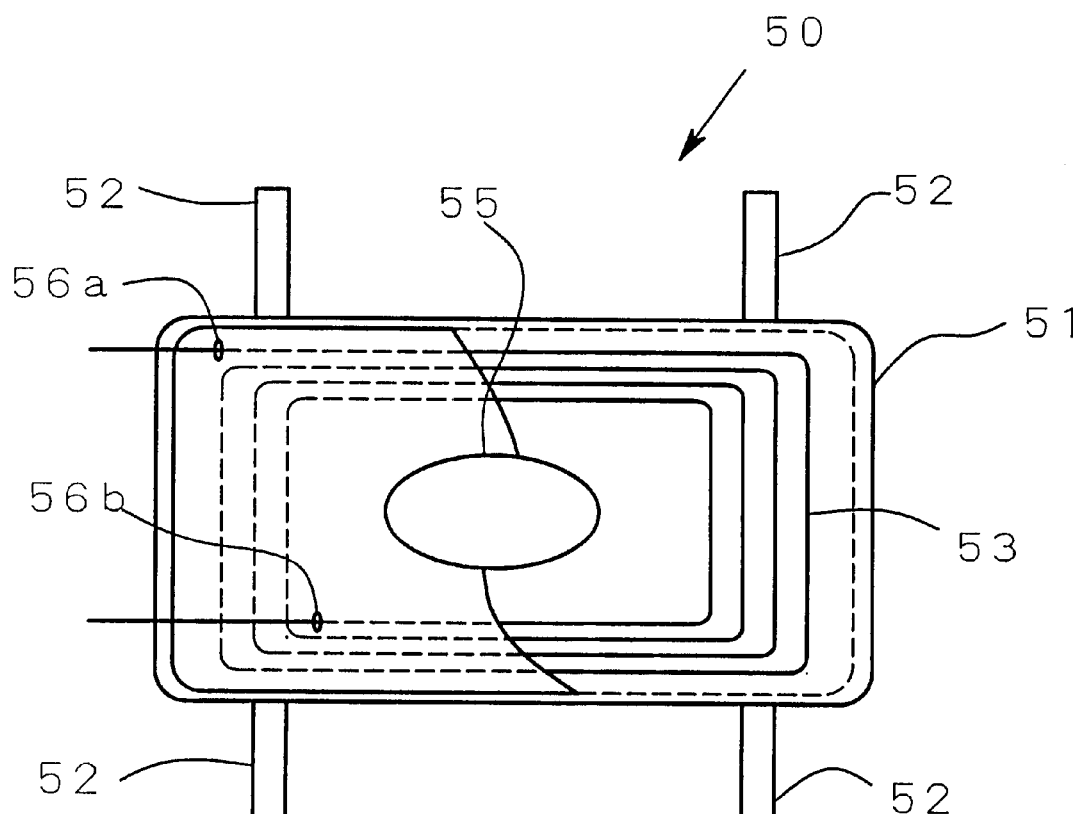
FIG. 8(a) illustrates a plan view of another embodiment of a coil unit for induction heating of the present invention.

As illustrated in FIG. 8(a), a coil unit for induction heating 50 of the illustrated embodiment comprises a bag-like heat-resistant cloth 51 that is wound around the manifold 10 and mounted thereto, a spiral coil 53 mounted to an inner side of the bag-like heat-resistant cloth 51, and string-like tying portions 52 provided on both ends of the heat-resistant cloth 51.

Figure 8B:
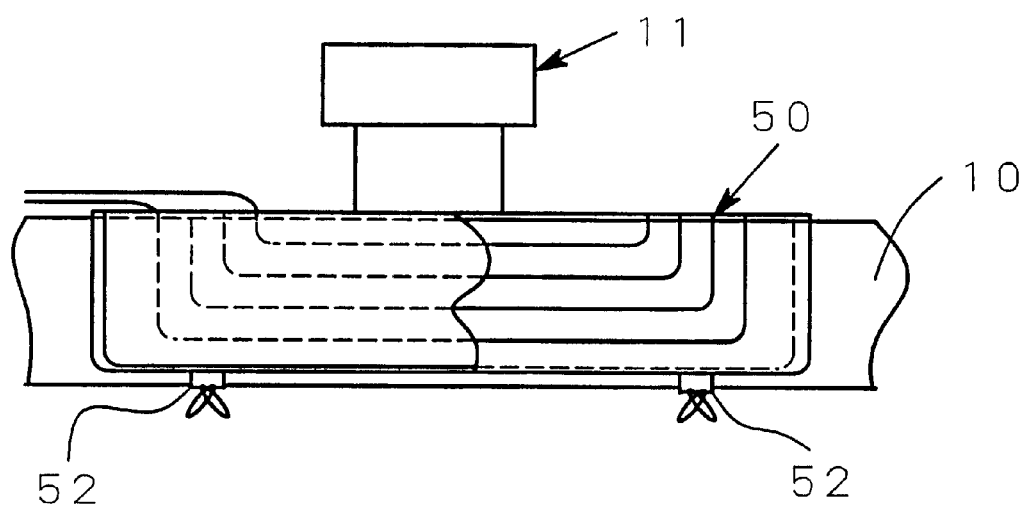
FIG. 8(b) is a side view showing a condition where the coil unit for induction heating is mounted to the manifold.

The heat-resistant cloth 51 is comprised by weaving heat-resistant fibers such as alumina fibers or aluminosilicate fibers in a bag-like manner. It is alternatively possible to form the cloth 51 in a bag-like manner by adhering or sewing a plurality of heat-resistant cloths together. An opening 55 may be formed on a predetermined portion of the heat-resistant cloth 51 which allows insertion of the sprue 11 or the like, as illustrated in FIG. 8(b).

The coil for induction heating 53 is disposed inside the bag-like heat-resistant cloth 51 in a spiral manner. The coil for induction heating 53 is preliminarily wound in a spiral manner such that adjacent wires do not contact each other. This coil for induction heating 53 is sewn to the heat-resistant cloth 51 within the bag-like heat-resistant cloth 51 by a heat-resistant member such as one of the above-listed heat-resistant fiber or the like.

Both ends of the coil for induction heating 53 project outside the bag-like heat-resistant cloth 51.

The string-like tying portions 52 may be formed from a part of the heat-resistant cloth 51, and it is alternatively possible to sew separately formed tying portions 52 to both ends of the heat-resistant cloth 51 by using one of the above-listed heat-resistant fiber or the like.

The thus arranged coil unit for induction heating 50 is bent to suit the outer shape of mounting portions of the manifold 10, as illustrated in FIG. 8(b). The tying portions 52, 52 on both ends of the heat-resistant cloth 51 are tied astride the manifold 10.

In this manner, the coil for induction heating 53 may be mounted to the manifold 10 together with the heat-resistant cloth 51.

Thereafter, both ends of the coil 53 projecting outside the coil for induction heating 53 are connected to lead wires (not shown) that are connected to an external power source.

The tying portions are not limited to those of the above-described embodiment.

It is, for instance, possible to provide male snaps 57 on both ends of the heat-resistant cloth 51 and to provide female snaps 59 on both ends of the string-like tying members 58 formed as separate bodies from the heat-resistant cloth 51, as shown in FIG. 9. By fitting the male snaps 57 and the female snaps 59 together, both ends of the heat-resistant cloth 51 may be tied by the tying members 58.

Though not shown in the drawings, both ends of the heat-resistant cloth may be tied by heat-resistant wires as another embodiment.

According to these embodiments, attaching and detaching the coil unit for induction heating 50 to and from the manifold 10 may be performed in a still simpler manner, and such embodiments are also advantaged in view of costs.

According to the present invention, a coil for induction heating is wound to a side surface on which a clamping force of a manifold does not act along an axial direction of a runner, the coil may be wound over the entire length of the runner to make the temperature of molten material contained in the runner uniform, and it is accordingly possible to prevent irregularities in qualities of injection-molded articles and occurrence of pouring deficiencies.

Since the material may be uniformly heated, it will no more be necessary to partially perform heating at a temperature that is remarkably higher than a melting point when performing injection molding of molten metal having a high melting point and exhibiting favorable thermal conductivity such as magnesium, and to thereby reduce the danger of run-out or thermal distortion or the like. The life of a coil itself will not be shortened, either.

Since a coil may be wound irrespective of supporting members, the strength of the supporting members will not be weakened.

Coils may be easily attached to and detached from the manifold and thus exhibits superior workability.

Industrial Applicability

The present invention is widely applicable to molds in a hot runner injection molding not only for resin but also for metals such as magnesium alloy, aluminum alloy or zinc alloy.

What is claimed is:

1. An induction heating coil unit for a manifold in a hot runner mold including a fixed mold and a movable mold, said manifold having a runner with side surfaces where no clamping force is applied by the fixed and movable molds, said coil unit comprising:

a coil holding body having means to be attachable to and detachable from the runner of the manifold and to be disposed along the side surfaces of the manifold, and a wound coil held by the coil holding body and having four coil sections extending continuously as one unit, at least two of the four coil sections facing each other and rest of the coil sections being disposed between the two coil sections facing each other to allow the four coil sections to be disposed along the side surfaces of the runner of the manifold to heat the manifold from the side surfaces.

2. The induction heating coil unit for a manifold of a hot runner mold as recited in claim 1, wherein the coil holding body is provided with two side surfaces facing each other and one side surface between the two side surfaces to face three sides of the manifold, said coil extending in a spiral form on the three side surfaces and being held by the coil holding body.

3. The induction heating coil unit for a manifold of a hot runner mold as recited in claim 1, wherein the coil holding body is a heat-resistant cloth.

4. The induction heating coil unit for a manifold of a hot runner mold as recited in claim 3, wherein the heat-resistant cloth includes tying portions on two ends, said heat-resistant cloth being adapted to be mounted on the manifold and attached thereto by tying the tying portions astride the manifold.

5. The induction heating coil unit for a manifold of a hot runner mold as recited in claim 1, wherein said coil holding body has four side surfaces in a form of a loop extending in a direction perpendicular to a clamping force application direction, said coil being wound spirally on the four side surfaces of the coil holding body.

6. The induction heating coil unit for a manifold of a hot runner mold as recited in claim 1, wherein said rest of the coil sections are disposed on one side between the two coil sections facing each other so that the coil sections are located at three sides.

\* \* \* \* \*